US006689478B2

(12) United States Patent
Laguitton

(10) Patent No.: US 6,689,478 B2
(45) Date of Patent: Feb. 10, 2004

(54) POLYANION/POLYCATION MULTILAYER FILM FOR DNA IMMOBILIZATION

(75) Inventor: Bruno Laguitton, Le-Kremlin-Bicetre (FR)

(73) Assignee: Corning Incorporated, Corning, NY (US)

( * ) Notice: Subject to any disclaimer, the term of this patent is extended or adjusted under 35 U.S.C. 154(b) by 5 days.

(21) Appl. No.: 09/886,759

(22) Filed: Jun. 21, 2001

(65) Prior Publication Data

US 2003/0003272 A1 Jan. 2, 2003

(51) Int. Cl.$^7$ .............................. B32B 17/10; B05D 1/18
(52) U.S. Cl. ..................... 428/441; 427/2.11; 427/2.13; 428/333; 428/411.1
(58) Field of Search ................................ 428/333, 441, 428/411.1; 427/2.11, 2.13, 430.1

(56) References Cited

U.S. PATENT DOCUMENTS

| | | | |
|---|---|---|---|
| 5,208,111 A | 5/1993 | Decher et al. | ............... 428/420 |
| 5,518,767 A | 5/1996 | Rubner et al. | ............... 427/259 |
| 5,683,875 A | 11/1997 | Lichtenwalter | ................ 435/6 |
| 5,716,709 A | 2/1998 | Ferguson et al. | ............ 428/420 |

FOREIGN PATENT DOCUMENTS

| | | |
|---|---|---|
| WO | WO 90/01564 | 2/1990 |
| WO | WO 99/35520 | * 7/1999 |

OTHER PUBLICATIONS

Gleb B. Sukhorukov et al., "Reversible Swelling of Polyanion/Polycation Multilayer Films in Solutions of Different Ionic Strength", Phys. Chem., 100, No. 6, 1996, pp. 948–953.

Yuri Lvov et al., "Ultrathin Films of Charged Polysaccharides Assembled Alternately With Linear Polyions", J. Biomater. Sci. Polymer Edn., vol. 9, No. 4, pp. 345–355.

Gleb B. Sukhorukov et al., "Layer–By–Layer Self Assembly of Polyelectrolytes on Colloidal Particles", Colloids and Surfaces, Physicochemical and Engineering Aspects, 137 (1998), pp. 253–266.

A.L. Weisenhorn et al., "Imaging Single–Stranded DNA, Antigen–Antibody Reaction and Polymerized Langmuir–Blodgett Films With An Atomic Force Microscope", Scanning Microscopy, vol. 4, No. 3, 1990, pp. 511–516.

Gero Decher, "Fuzzy nanoassemblies: Toward Layered Polymeric Multicomposites", Science, vol. 277, Aug. 29, 1997, pp. 1232–1237.

Yoshio Okahata et al., "Oriented Thin Films of a DNA–Lipid Complex", Thin Solid Films 284–285 (1996), pp. 6–8.

Gleb B. Sukhorukov, "Multilayer Films Containing Immobilized Nucleic Acids. Their Structure and Possibilities in Biosensor Applications", Biosensors & Bioelectronics, vol. 11, No. 9, pp. 913–922, 1996.

* cited by examiner

*Primary Examiner*—D. S. Nakarani
(74) *Attorney, Agent, or Firm*—Thomas R. Beall; Vincent T. Kung

(57) ABSTRACT

A substrate with a charged surface coated with one or more bilayers of oppositely charged polyelectrolytes. Subsequent optional bilayers of polyelectrolytes must bear alternating opposite charges. The final or top layer may be activated for biomolecular attachment.

19 Claims, 4 Drawing Sheets

POLYANION/POLYCATION MULTILAYER FILM FOR DNA IMMOBILIZATION

FIELD OF THE INVENTION

In general this invention relates to a coated substrate and methods of making the coated substrate. Specifically, the invention is a substrate having a charged film for use in the optical, electrical and biological fields, and a method of making the substrate having a charged film.

TECHNICAL BACKGROUND OF THE INVENTION

Analysis of the structure, organization and sequence of nucleic acid molecules is of profound importance in the prediction, diagnosis and treatment of human disease and in the study of gene discovery, expression, and development. A fundamental tool used in the analysis of nucleic acid molecules is the high density array (HDA). The HDA provides the framework for the immobilization of nucleic acid molecules for analysis on a rapid, large-scale basis. HDAs generally include a substrate having a large number of positionally distinct DNA probes attached to a surface of the substrate for subsequent hybridization to a DNA target. The key to efficiently immobilizing nucleic acid molecules is the surface chemistry and surface morphology of the HDA substrate.

The surfaces of both organic and inorganic substrates can be modified by the deposition of a polymer monolayer coating or film in order to construct biomolecular assemblies. In addition, surface modification can also be used to promote adhesion and lubrication, prevent corrosion, modify the electrical and optical properties of the substrate surface, and create electroactive films suitable for various optical and electronic sensors and devices.

However, the problem with monolayer films is that they were not capable of being modified to achieve a desired surface characteristic such as uniform electrical charge with a precisely controlled thickness and molecular organization. In order to obtain this desired surface characteristic, a multilayered film having a well-defined molecular organization in a smooth geometrical arrangement was produced on a substrate. Two methods that were developed to achieve this goal for the preparation of multilayered films were the Langmuir-Blodgett method and the Decher et al. method.

In the Langmuir-Blodgett (LB) technique, a monolayer is formed on the surface of water and then transferred onto solid substrates. Paras N. Prasad & W. M. K. P. Wijekoon, *Langmuir-Blodgett Films (Organic Polymers for Photonics Applications)* pp. 3552–3554 (Joseph C. Salamone, POLYMERIC MATERIALS ENCYCLOPEDIA (1996)). The following steps show how the complicated LB technique is performed. First, a molecular structure with amphiphilic properties is dissolved in an appropriate solvent and spread on the surface of water. Second, the molecules with amphiphilic properties on the surface of the water are compressed slowly to form a compact monolayer by monitoring the surface pressure-area isotherm. Third, the monolayer is transferred from the water surface onto the surface of a substrate while under the pressure-area isotherm by insertion into or withdrawal of the substrate from the floating monolayer.

Although this process is effective for depositing multilayered films, it is subject to limitations. For example, the substrates to be coated by the LB method are limited in size due to the required mechanical manipulation in the film building process. Further, the films produced by this method are subject to gaps or spaces due to the non-uniform close packing of the amphiphiles on the liquid surface before the transfer onto a the solid substrate.

Another disadvantage of films created by the LB technique is that they are inherently unstable. The instability is due to the transfer of the films to the substrate in liquid form, which allows for adhesion of the film to the substrate primarily through weak van der Waals forces; therefore, the layers of the LB film that constitute the surface of the substrate are mechanically unstable.

Decher et al., U.S. Pat. No. 5,208,111, incorporated for all purposes, herein by reference, has demonstrated that it is possible to build up multilayer thin films onto charged surfaces via alternating deposition of polycations and polyanions. (See also Decher, *Science*. 277, 1233 (1997). The Decher method is illustrated by FIGS. 1A–1F.

FIG. 1A shows a schematic of the film deposition process as one slide 10 is progressively dipped into a series of beakers. Beaker 1 contains a polyanion solution; beaker 2 contains a wash solution, beaker 3 contains a polycation solution, and beaker 4 also contains a wash solution. The slide 10 having a layer of cations attached to its surface is dipped sequentially into beakers 1–4. After being removed from beaker 1, the slide 10 contains a monolayer polyanionic coating electrostatically attached to the cation layer. It retains this coating after washing in beaker 2. The slide 10 next receives a polycationic monolayer coating electrostatically attached to the polyanion monolayer by dipping in beaker 3. After washing in beaker 4, a single polyanion/polycation bilayer is attached to the prior oppositely charged layer of the slide. The process may be repeated for any number of polyanion/polycation bilayers. The four steps are the basic buildup sequence for the simplest bilayer film, $(A/B)_n$ formed by the attachment of a polyanion to a polycation.

The construction of more complex films may be accomplished by using different polycation/polyanion solutions.

FIGS. 1B to 1D are a simplified molecular picture of the first two adsorption steps as illustrated in FIG. 1A, depicting film deposition starting with a slide 10. Counterions were omitted for clarity. FIG. 1B depicts the slide 10 prior to immersion into the polyanion solution 2. The slide 10 has a cation layer 12 on the surface. The polyion conformation and layer interpenetration represent an idealization of the surface charge reversal with each adsorption step. FIG. 1C depicts the slide 10 after removal from beaker 2. The cation layer 12 has a polyanion layer 14 attached to it. FIG. 1D depicts the substrate 10 after removal from beaker 4. Finally, the polyanion layer 14 is attached to a polycation layer 16.

FIG. 1E represents the chemical structure of a typical polyanion, the sodium salt of poly(styrene sulfonate) (PSS) 18, used in the Decher method. FIG. 1F represents the chemical structure of a typical polycation, poly(allylamine hydrochloride) (PAH) 20.

Using the Decher method, in the post-preparation treatment of the films, the surface is smoothed by consecutive immersions of the films in solutions of salt. Presumably, the salt breaks some of the anion-cation bonds, and their removal by washing in pure water leads to the reformation of the polymer chains in a more equilibrated conformation. The resulting smooth film creates a problem for use as a substrate for performing DNA hybridization experiments, viz. that a single stranded DNA molecule is more likely to become physically pinned down due to electrostatic interactions along the entire length of the smooth charged substrate surface. This "pinning" effect prevents free access by a complimentary strand, and thereby inhibits hybridization.

The present invention is a multilayered charged thin film that has an inherent and controlled surface roughness that has been demonstrated to facilitate and enhance the immobilization and hybridization of nucleic acids. The present invention is a reproducible, simple and effective procedure for making multilayered charged thin films. Once coated by the disclosed method, a substrate will facilitate the improved retention of nucleic acids to its surface by ionic interactions. This multilayered charged thin film on a substrate forms a durable surface that will endure the effect of time and adverse environmental conditions. This invention provides a way to obtain homogeneous, less labile and more resistant thin films compared with the γAPS aminated and other positively charged surfaces.

SUMMARY OF THE INVENTION

The present invention is a multilayered charged thin film applied to a substrate with a surface charge. A first layer of polyelectrolyte having an opposite charge to the substrate surface charge adheres to the substrate electrostatically. Additional polyelectrolyte layers can be placed on top of the first polyelectrolyte layer as long as additional layers have an opposite charge from the charge of the prior layer. In order to achieve a desired roughness, each successive layer is deposited in different solutions of an alternatively charged polyelectrolyte mixed with salt. The polyelectrolyte layers are composed to achieve a precise surface roughness that optimizes the adhesion of a binding entity and facilitates the hybridization of DNA in performing DNA hybridization assays. The final polyelectrolyte layer is aminated or activated for noncovalent bonding to a specific binding entity.

DETAILED DESCRIPTION OF THE INVENTION

Figure 1A:
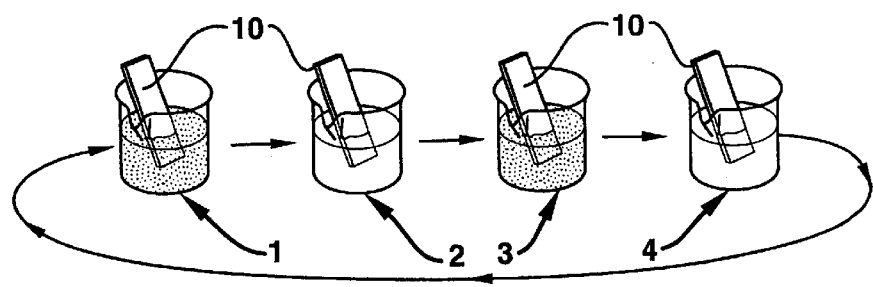
FIGS. 1A to 1F illustrates the production of a multilayered film using the Decher method.
Figure 1B:
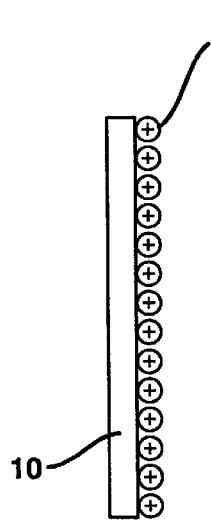
Figure 1C:
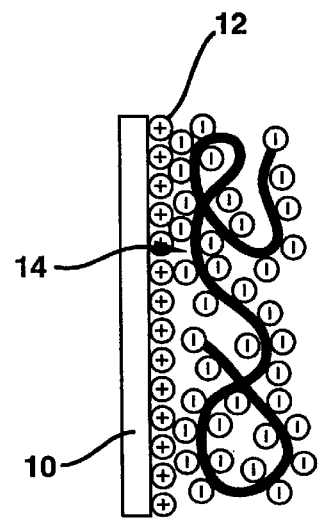
Figure 1D:
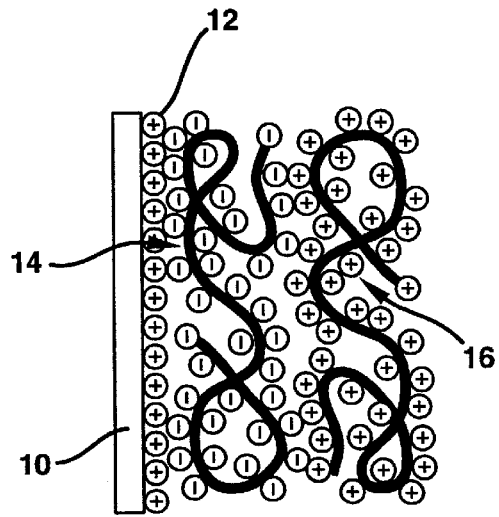
Figure 1E:
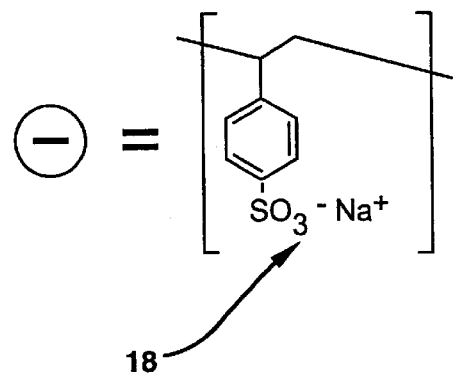
Figure 1F:
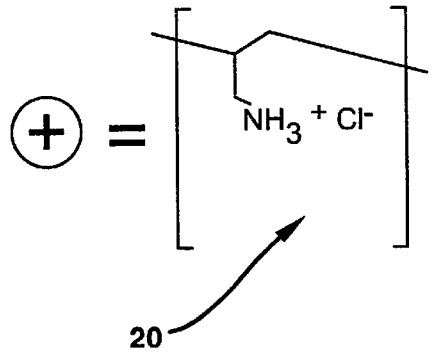
Figure 2:
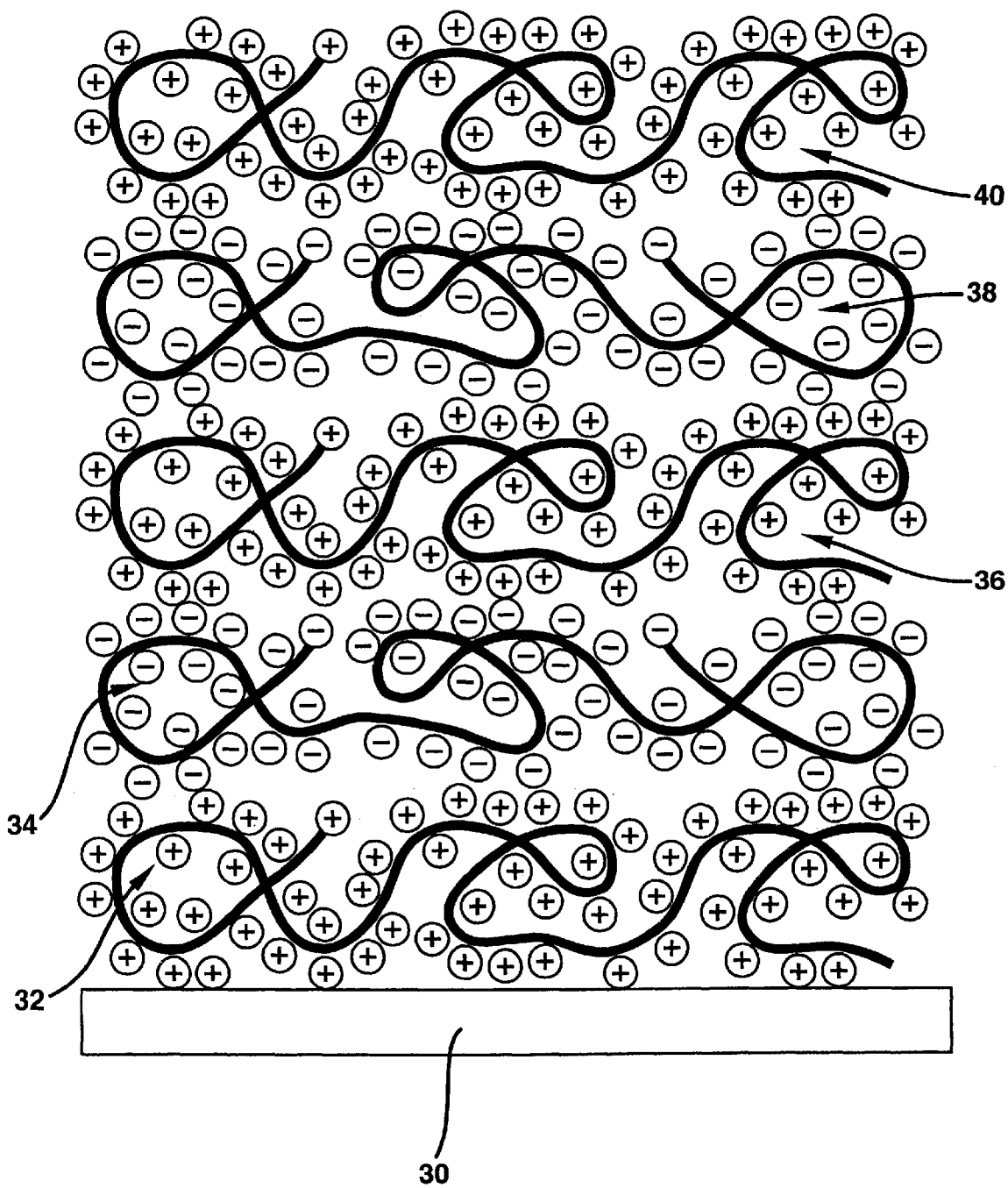
FIG. 2 illustrates a substrate coated with two bilayers of polyelectrolytes with an outermost polycation layer.

FIG. 2 illustrates a glass substrate 30 coated with alternating charged polyelectrolyte layers. While the substrate material is usually glass and most preferably alkaline earth aluminoborosilicate glass, a variety of materials may be employed.

Suitable substrates for the layer elements according to this invention are those having a surface which is accessible to solvents. The substrate itself may take any shape including but not limited to: rectangular, square, circular, cylindrical, conical, planar, and spherical. The interior surface of a bottle or tubing could be used. The preferred substrate has a planar shape. The substrate may also be formed into a variety of HDAs, microplates, and laboratory dishes.

For optical or electrical areas of application, the substrate can be transparent, impermeable or reflecting as well as electrically conducting, semi-conducting or insulating. For biological applications, the substrate material may be either porous or nonporous and may be selected from either organic or inorganic materials.

Inorganic substrate materials can include metals, semiconductor materials, glass, and ceramic materials as described in the U.S. Pat. No. 5,208,111 herein incorporated by reference. Examples of metals that can be used as substrate material are gold, platinum, nickel, palladium, aluminum, chromium, steel, and gallium arsenide. Semiconductor materials used for the substrate material can include silicon and germanium. Glass and ceramic materials used for the substrate material can include: quartz glass, porcelain, alkaline earth aluminoborosilicate glass and other mixed oxides, which are understood to mean ceramic materials. Further examples of inorganic substrate materials include graphite, zinc selenide, mica, silicon dioxide, lithium niobate, silicium, and further substrate material, in the form of inorganic single crystals, such as those known to one skilled in LB technology.

Organic substrate materials are predominantly made from polymer materials, due to the dimensional stability and resistance to solvents. Examples of organic substrate materials are: polyesters, such as polyethylene terephthalate, and polybutylene terephthalate, polyvinylchloride, polyvinylidene fluoride, polytetrafluoroethylene, polycarbonate, polyamide, poly(meth)acrylate, polystyrene, polyethylene or ethylene/vinyl acetate copolymer.

The substrate must carry either a positive or negative uniform electrical surface charge. The charge is needed in order to form an electrostatic bond with the polyelectrolyte. As recognized by one skilled in the art, there are a wide variety of materials that can be used for the substrate.

Once a suitable substrate is procured, a polyelectrolyte is affixed to the surface of the substrate by using a variety of techniques. The simplest method is by immersing a substrate in an aqueous solution containing a controlled polyelectrolyte-salt concentration.

The deposition process is driven by ionic strength based on the pH and the salt concentration of the solution. The pH range of the solution can vary unto the point of chemical degradation of the polyelectrolytes.

The range of the salt concentration in the solution is $10^{-2}$ mole/liter to 2 mole/liter. The ionic strength of the solution is in direct proportion to the salt concentration in the solution. The ionic strength of the solution controls the degree of coiling of the polyelectrolyte, which is measured in terms of surface texture, the lower the ionic strength of the solution the smoother the surface, the higher the ionic strength of the solution the rougher the surface.

In FIG. 2, the first layer 32 represents a polyelectrolyte in the form of a polycation. The first layer of polyelectrolyte must have a charge opposite that of the substrate surface. In FIG. 2, a polycation must be the first layer used because the glass surface retains a negative charge. In a preferred embodiment, the first layer of polyelectrolyte has primary ammonium moiety.

The polyelectrolytes, applied in their salt form, are fully or partially electrically charged. Once the polyelectrolyte salt is made into a solution, the counter ions go into the solution such that the charge interactions between the polyelectrolytes can occur. The second layer of polyelectrolyte, a polyanion, 34 has a negative charge. Subsequent polyelectrolyte layers on the substrate are added, each having an alternating charge. One polyelectrolyte layer attached to an oppositely charged second polyelectrolyte layer forms a single bilayer. The term bilayer as used herein shall carry this meaning. The charges of the polyelectrolytes must be opposite to allow ionic bonding to occur so that the layers of polyelectrolytes 32–40 will become firmly affixed to each other as well as to the substrate.

Examples of polyelectrolytes that can be applied to the substrate are: polyacrylic acid, polymethacrylic acid, polyethylenesulphonic acid, polyvinylsulphonic acid, polystyrenesulphonic acid, polyvinylphenylsulphuric acid (phenol ester) maleic acid/alkene copolymer, maleic acid/vinyl alkyl ether copolymer, polyglutamic acid, polysilicic acid, polyphosphoric acid, polysaccharides, chitosan, polylysine, and the corresponding copolymers with neutral amino acids, polyvinylamine, polyethyleneimine, polyviny-4-alkylpyridinium salt, polysilicic salt, polyshosphoric salt, polysaccharide salts, poly(methylene)-N,N-dimethylpiperidinium salt, poly(vinylbenzyltrimethylammonium) salt, dextran, heparin, polyallylamine, polystyrene sulfonate (PSS), polyallylamine hydrochloride (PAH), sulfonated polyaniline, and tetrahydrothiophenium precursor polyelectrolyte of polyvinylpyrole. This list is not intended to be an exhaustive listing of all the polyelectrolytes that can be affixed to the surface of the substrate. Natural polyelectrolytes can also be affixed to the substrate surface (e.g. DNA, proteins, and silk). Polyelectrolytes affixed to the substrate surface may have a variety of molecular arrangements (e.g. linear, hyperbranched, or starlike).

In a preferred embodiment, the outermost layer of polyelectrolyte is a polycation polymer.

A wide variety of salts may be used to compose the polyelectrolyte-salt solution. Any water-soluble inorganic or ionizable salt will roughen the polyelectrolyte. Any metallic salt that ionizes can be used with the polyelectrolyte. Salts can include sodium chloride, magnesium chloride, and calcium chloride. The salt attaches to the polyelectrolyte by an electrostatic interaction. The purpose of mixing salt with a polyelectrolyte is to create macromolecular coiling which in turn makes the surface of each polyelectrolyte layer rough. The salt changes the conformation of the chains by screening the charges along the chains. The salt increases the thickness of the deposited layers and gradually increases the roughness of the surface texture in direct proportion to the number of deposited layers. When an additional coating of polyelectrolyte is attached to the surface, the added polyelectrolyte is a stronger electrolyte that replaces the salt ion from the surface of the prior polyelectrolyte.

The surface roughness originates from the first deposition step of a substrate into a high ionic strength solution of polyelectrolyte. Salt added to the polyelectrolyte solution screens the charges on the chains. This addition results in a transformation from a linear conformation to a random coil conformation (the polyelectrolyte chains begin to approach the behavior of a neutral polymer).

The substrate is then rinsed by dipping it into a solution of pure water in order to remove excess polyelectrolyte.

The roughness provided by the initial dipping in the high ionic strength polyelectrolyte solution is then increased with a second deposition step of high ionic strength solution of an oppositely charged polyelectrolyte. The dipping technique allows the surface of the film to be disorganized on the surface and homogeneous beneath the surface.

The substrate is again rinsed by dipping it into a solution of pure water after the second step in order to remove excess polyelectrolyte.

These four steps are repeated until the optimum multilayered thin film surface is achieved through the gradual increase in roughness produced with each successive step.

The outermost polyelectrolyte layer on the substrate is aminated with an amine functional group. The amination provides the charge for the subsequent immobilization of the DNA. Attachment of the DNA molecule to the aminated surface by non-covalent ionic bonding replaces the salt ion from the top layer since DNA is a strong polyanion. Polyelectrolyte chains with the same charge as these counter-ions replace any remaining counter-ions of the polyelectrolyte on the outermost layer during the deposition process. The attachment by the DNA spins off any remaining salt ions or counter-ions.

One embodiment of this invention uses oligonucleotides or cDNA for attachment to the outermost polyelectrolyte layer. Oligonucleotides and/or cDNA attach electrostatically to an aminated topmost polycation surface.

Other biological or synthetic molecules can be attached to the outermost polyelectrolyte layer with the amine functionality or by means of other known attachment chemistries. "Binding entities" are biological or synthetic molecules having a specific affinity for another molecule through covalent or noncovalent bonding. Preferably, a specific binding entity contains a functional chemical group (primary amine, sulfhydryl, aldehyde, etc.), a common sequence (nucleic acids), an epitope (antibodies), a hapten, or a ligand that allows it to covalently or noncovalently bond to a common function group on the surface of a substrate depending on which binding entity is used. Specific binding entities include, but are not limited to: ribonucleic acids (RNA), deoxyribonucleic acids (DNA), synthetic oligonucleotides, antibodies, proteins, peptides, lectins, modified polysaccharides, synthetic composite macromolecules, functionalized nanostructures, synthetic polymers, modified/blocked nucleotides/nucleosides, modified/blocked amino acids, fluorophores, chromophores, ligands, chelates and haptens. The term "biomolecule" and "binding entity" are interchangeable for purposes of this disclosure.

EXAMPLE

Fourteen ESCO™ (Erie Scientific Co., Portsmouth, N.H.) soda lime slides were used in this example as the substrate. Two substrates were prepared with 1 bilayer, two substrates were prepared with 3 bilayers, six substrates were prepared with 5 bilayers, two substrates were prepared with 7 bilayers, and two substrates were prepared with 9 bilayers. Each of the fourteen slides was prepared with an outermost polycation layer.

In preparation for the experiment the slides were cleaned. The cleaning procedure used resulted in some negatively charged silicon oxide moieties on the surface, which were subsequently electrostatically bound to a positively charged polyelectrolyte.

Throughout the experiment the slides were manipulated with plastic or Teflon tweezers and processed and stored in plastic or Teflon beakers.

First, the slides were cleaned in a solution of 50:50 mixture of hydrogen peroxide (30%, electronic grade) and sulfuric acid (98%, electronic grade). Second, the slides were rinsed with dionized water of "ultra pure" quality, such as commercially available through the Milli-Q® Ultrapure Water Purification Systems by Millipore Corporation (e.g., 18.5 Ω·cm), in which organic and elemental impurities are reduced to negligible levels (e.g., ~1–5–10 ppb TOC, or sub-ppt levels of elemental contamination). Third, the slides were immediately placed in a bath of the deionized ultra pure Milli-Q® water in order to avoid contamination.

In order to begin applying the film to the slides, they were first removed from the bath and dried with a vigorous flow of anti-dust filtered nitrogen gas. The application of the film was performed using the "four-beaker process" having the following steps: 1) the cleaned substrates were immersed into a polycation solution of high ionic strength (e.g. $10^{-2}$ monomole/liter polyethylemeine and 1 mole/liter of NaCl) for fifteen minutes; 2) the substrates were rinsed with deionized ultra-pure Milli-Q® water by dipping each substrate into three separate beakers of deionized ultra-pure Milli-Q® water for one minute each; 3) the substrates were immersed into a polyanion solution of high ionic strength (e.g. $10^{-2}$ monomole/liter polystyrenesulfonate (PSS) and 2 mole/liter of NaCl) for fifteen minutes; and 4) the substrates were again rinsed with the three beakers of deionized ultra-pure Milli-Q® water for one minute each. The cycle of deposition was repeated until the 1, 3, 5, 7, and 9 bilayers were complete. A final single layer of polycation was added to each substrate using step 1 and step 2.

The amine moieties on the final layer were then exposed by using the staining method by Aurodye™ and Intense BL silver from Amersham (Nycomed, TLC, Buckinghamshire, UK). The result was a thin transparent film with homogeneous transparency.

Ten of the 14 prepared slides were immediately used for hybridization and measurement and 4 of the 6 slides having 5 bilayers were stored for later hybridization and measurement.

Printing

Prior to printing the DNA probe was prepared with three steps. First the probe (cDNA or PCR-based) was brought up to a 15 μL total in 3xSSC, 0.1% SDS with 10 μg poly A (10 mg/mL stock; Pharmacia, ref. 27-4110-01) and 10 μg E. coli tRNA (4 mg/mL stock; Boehringer-Mannheim, ref. 109 550). Second, boiling for between 3 to 5 minutes in a heat block denatured the probe. Third, the probe was snap-cooled on ice.

Printing the DNA probe was performed on a noncommercial robot with movement capabilities in the X, Y, and Z directions. A piezo head (ref. MDK-140H, Microdrop, GmbH., Norderstedt, Germany) was used for the printing. The noncommercial robot actuated the piezo for 0.03 seconds for a nanoliter volume range of dispensation.

Hybridization

The materials used for hybridization were succinic anhydride (Aldrich Inc. ref. 13,4441-4), n-methyl-2-pyrrolidinone (Aldrich Inc. ref. 32,863-4), boric acid (Gibco BRL. ref. 15583-024), 20xSSC (Sigma Inc. ref. S6639), SDS (Amresco, ref. 0837), and absolute ethanol (Merck, ref. 1 000983).

Next, the slides were prepared for hybridization with three steps. First, the slides were snap-dried on a 100° C. hot plate for three seconds. Second, the slides were soaked in a blocking solution for 15 minutes made from (70 millimole) succinic anhydride in a solution consisting of 315 ml of n-methyl-2-pyrrolidinone and 35 ml of 0.2 M boric acid (pH 8). Third, the slides were denatured in water at 95° C. for 2 minutes, followed by an ethanol rinse, and dried with nitrogen gas.

The slides were then hybridized in three steps. First, the target was pipetted onto the slides and a drop cover slip was placed onto the liquid. Second, the slides were assembled in the hybridization chamber and clamped shut. Third, the slides were submerged in a 50° C. water bath for approximately 12 hours.

Finally, the slides were cleaned by removing the coverslip with tweezers, placing the slides in 0.1xSSC, 0.1% SDS at room temperature for between 5 to 10 minutes, transferring the slides to 0.1xSSC for between 5 to 10 minutes and drying the slides with nitrogen gas.

The hybridized slides were then scanned on the Scan Array 3000 (General Scanning Inc., Watertown, Mass.). The spots were then quantified with Optimas™ (Optimas Corp., Bothell, Wash.) software by delineating the spot according to a threshold value and calculating the mean gray signal within the defined surface.

The hybridization results were then obtained by reading the fluorescence after excitation with a laser at about 543 nm or at about 633 nm depending on the type of fluorophore in the DNA strand.

Results

During the testing of the layered substrates it was found that the number of bilayers had a large significance with regard to hybridization. With each respective number of bilayers, hybridization was measured and the results were evaluated. For bilayers one to five, hybridization worked progressively well. The optimal hybridization was found at the fifth polyelectrolyte bilayer.

Although not intending to be bound by the theory of operation the optimal hybridization rate was thought to be a consequence of roughness caused by the deposition of random coiled polyelectrolytes issued from high ionic strength solutions. The support for this conclusion is shown in the following table that summarizes the effect of roughness of the bilayer assembly on the hybridization.

The results are average values given in arbitrary units (a.u.) for the 10 substrates tested. Roughness is shown in root mean square values obtained by the atomic force microscopy measurements on a one-micron square area and is given in nanometers. The values for fluorescence intensity and root mean square are given for the odd number of bilayers on the substrates.

| Bilayers | Fluorescent Intensity | Root Mean Square |
| --- | --- | --- |
| N = 1 | 2,000 | 10 |
| N = 3 | 4,000 | 25 |
| N = 5 | 20,000 | 40 |
| N = 7 | Opaque | Not measured |
| N = 9 | Opaque | Not measured |

With each new bilayer added after the fifth bilayer, the rate of hybridization decreased. The surface of bilayers seven and nine were diffused and opaque due to the roughness of the surface such that the root mean square could not be measured. Also, a natural interference occurred at bilayers seven and nine that obviated the measurement of fluorescent intensity.

Images (FIG. 3 and FIG. 4) were later prepared by using additional slides with 3 and 5 bilayers respectively according to the method stated in the experimental section above (except for the substitution of PAH in place of polyethylemeine). The images were taken with a multimode atomic force microscope (AFM) manufactured by Digital Instruments Incorporated, with a resolution of 512 pixels per line using the tapping or intermittent mode operation under ambient room conditions. The images were then processed with Nanoscope IIIA, Version 4.42r2 software.

In these topographical images collected by AFM the bright regions represent elevated areas while the dark regions represent depressed areas. The images were taken with a moving probe positioned at an angle perpendicular to the surface.

Figure 3:
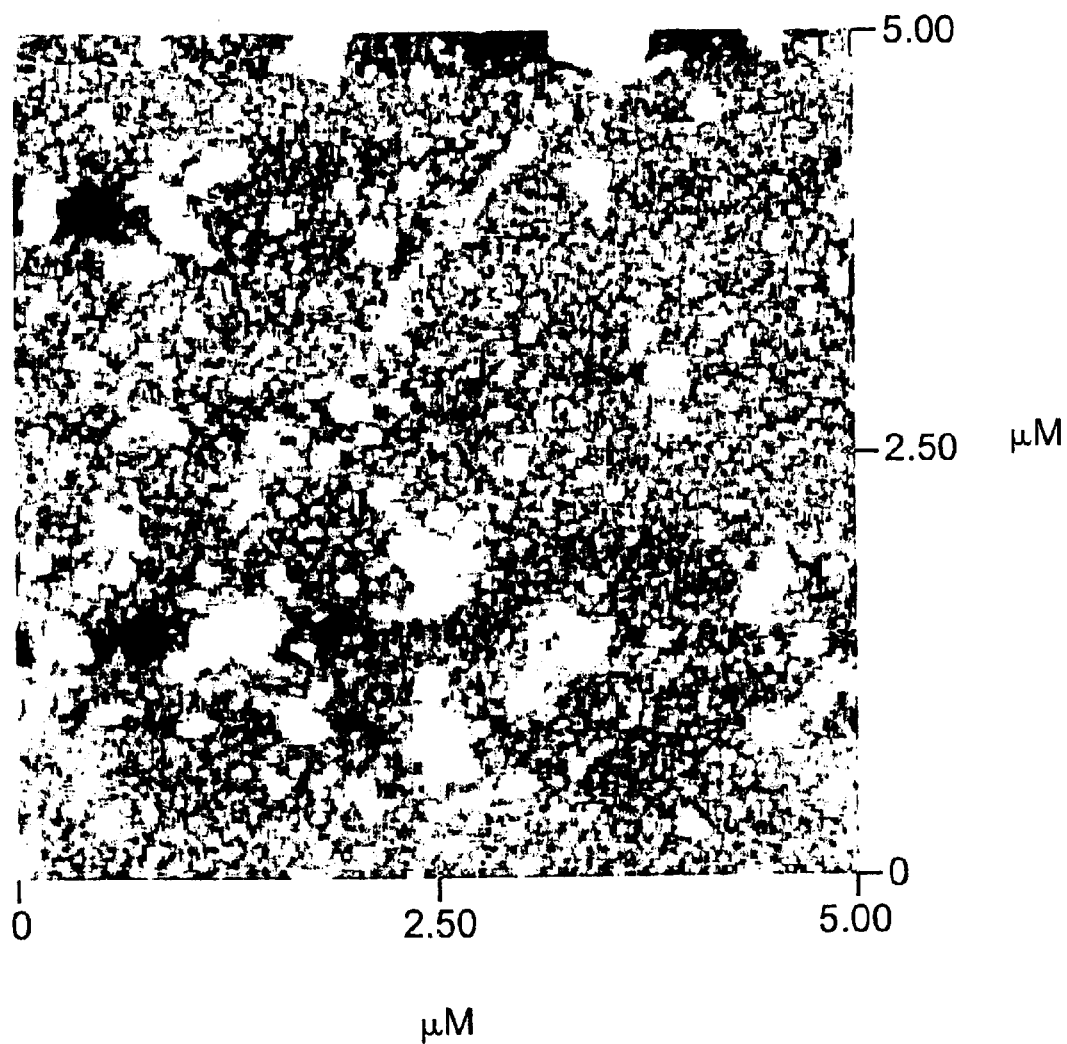
FIG. 3 is a scanned image of a 5-micron by 5-micron area of a glass slide prepared with three bilayers of polyelectrolytes with an outermost polycation layer.

FIG. 3 is a scanned image of a PAH-PSS glass surface (ESCO™ slide, Eric Scientific Co., Portsmouth, N.H.) with three bilayers. It shows an overall surface roughness with elevated peaks in the bright areas. The statistics on FIG. 3 are a Z range of 158.4 nanometers (nm), a raw mean of 4.6 nm, a root mean square of 14.4 nm, and a average roughness of 9.9 nm.

Figure 4:
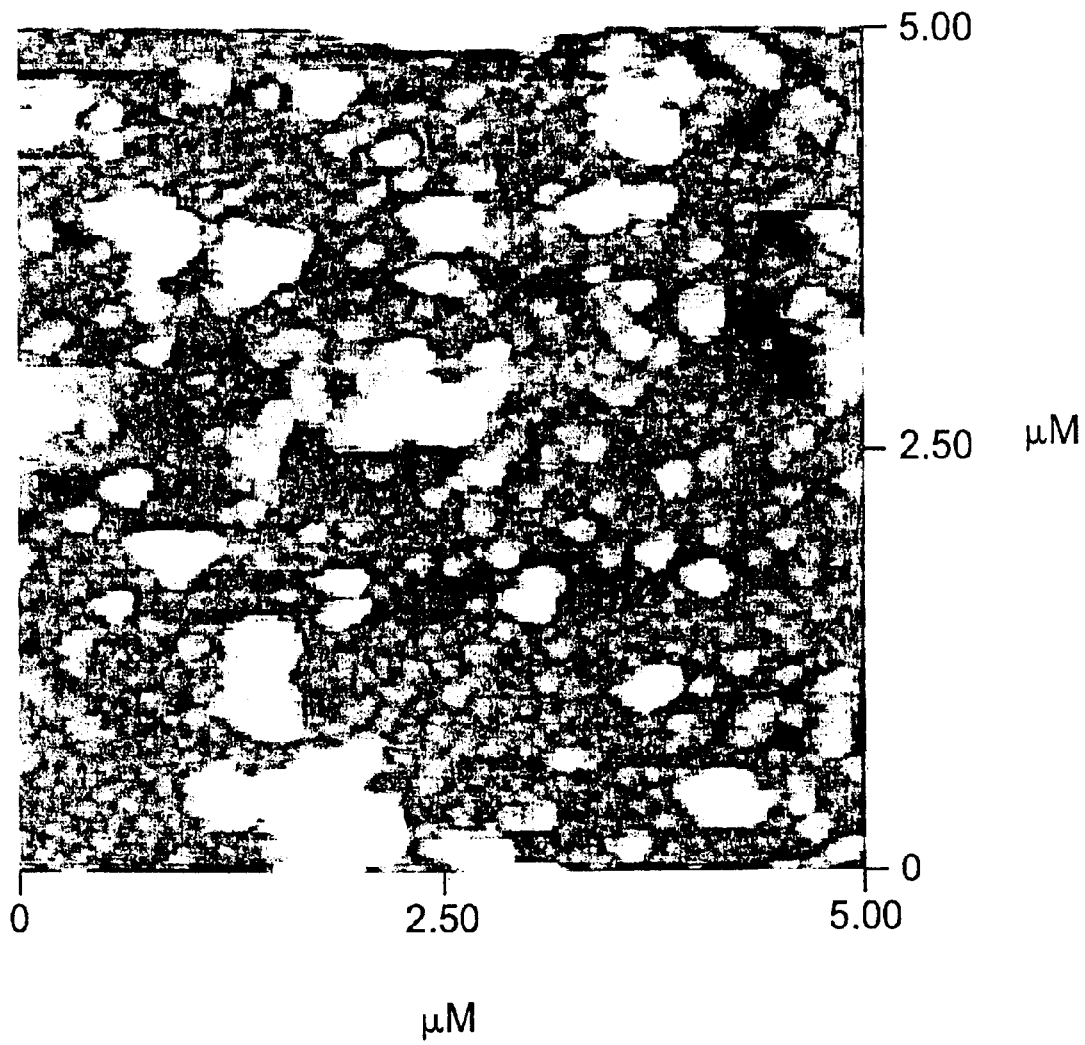
FIG. 4 is a scanned image of a 5-micron by 5-micron area of a glass slide prepared with five bilayers of polyelectrolytes with an outermost polycation layer.

FIG. 4 is a scanned image of a PAH-PSS glass surface (ESCO™ slide, Eric Scientific Co., Portsmouth, N.H.) with five bilayers. It shows the optimum level of overall surface roughness with elevated peaks in the bright areas. The statistics on FIG. 4 are a Z range of 520.8 nm, a raw mean of 131.5 nm, a root mean square of 43.5 nm and an average roughness of 28.0 nm.

A comparison of the two images reveals an increase in roughness as measured by the increase of the root mean square of 29.1 nm and increase in the Z range of 362.4 nm, which indicates an increase in the height of the elevated regions.

Durability Testing

The slides (held for later testing) that were prepared with 5 bilayers were kept in plastic (polypropylene) boxes under normal room conditions. After three months of storage, the same hybridization experiments were led on these substrates as with the other 10 substrates previously described. The hybridization signal from the slides held for later testing was essentially the same as before with approximately 20,000 (a.u.) for fluorescence intensity. The hybridization signals provided by three-month-old substrates were within 15% of the hybridization signals of the earlier 10 substrates that were promptly used. Therefore, these substrates were considered durable in the biological context.

Although the invention has been described in detail for the purpose of illustration, it is understood that such detail is solely for that purpose and variations can be made therein by those skilled in the art without departing from the spirit and scope of the invention which is defined by the following claims.

I claim:

1. A substrate having a charged film comprising:
   a) a substrate of an inorganic material having a charged surface;
   b) a first layer of polyelectrolyte having a charge opposite the charged surface; and
   c) additional layers of polyelectrolytes, each having a charge opposite to each adjacent layer, wherein, an outermost layer of polycation contains an amine functional group.

2. The film of claim 1, wherein the substrate is selected from the group consisting of mica, silicium, and an alkaline earth aluminoborosilicate glass.

3. The film of claim 1 wherein the polyelectrolytes are selected from a group consisting of polystyrene sulfonate, polyallylamine hydrochloride, sulfonated polyaniline, and a tetrahydrothiophenium precursor polyelectrolyte of polyvinylpyrole.

4. The film of claim 1 wherein the substrate having thereon 1 to 6 bilayers of polyelectrolytes.

5. The film of claim 4, wherein the bilayers have a surface roughness of between 10 and 60 nm.

6. The film of claim 5, wherein the bilayers have a surface roughness of 40 nm.

7. The film of claim 4 wherein the substrate having thereon 5 bilayers of polyelectrolytes.

8. The film of claim 1 wherein a first specific binding entity is attached to the outermost polycation layer.

9. The film of claim 8 wherein a second specific binding entity is attached to the first specific binding entity.

10. The film of claim 9 wherein said first specific binding entity is a DNA probe; wherein said second specific binding entity is a DNA target.

11. A substrate having a charged film comprising:
    a) a substrate made of an inorganic material;
    b) five polyelectrolyte bilayers attached to said substrate surface;
    c) a polycation layer functionalized with an amine group attached to an outermost bilayer;
    d) a first bound entity attached to the amine functional layer; and
    e) a second bound entity attached to the first bound entity.

12. A method for the preparation of a substrate having a charged film comprising the steps of:
    a) providing a substrate made of an inorganic material having a surface with a uniform surface charge;
    b) mixing a first polyelectrolyte with a salt to form a first polyelectrolyte mixture having a uniform charge opposite the charge of the substrate surface;
    c) applying the first polyelectrolyte mixture to the substrate surface, forming a first polyelectrolyte layer;
    d) mixing a second polyelectrolyte, having a charge opposite to the first polyelectrolyte, with a salt to form a second polyelectrolyte mixture;
    e) applying the second polyelectrolyte mixture to the first polyelectrolyte layer, forming a second polyelectrolyte layer;
    f) applying one or more additional layers of a polyelectrolyte mixture to the second layer, each additional layer having a charge opposite each immediately adjacent layer;
    g) applying an outermost polycation layer; and
    h) aminating the outermost polycation layer with an amine functional group to form an aminated outermost polycation layer.

13. The method of claim 12 wherein the substrate is selected from the group consisting of mica, silicium, and an alkaline earth aluminoborosilicate glass.

14. The method of claim 12 wherein the salt comprises a water soluble inorganic salt.

15. The method of claim 14 wherein the salt is selected from the group consisting of sodium chloride, magnesium chloride, and calcium chloride.

16. The method of claim 12 wherein the polyelectrolytes are selected from the group consisting of polystyrene sulfonate, polyallylamine hydrochloride, sulfonated polyaniline, and a tetrahydrothiophenium precursor polyelectrolyte of polyvinylpyrole.

17. The method of claim 12 further comprising the step of attaching a first specific binding entity to the aminated outermost polycation layer.

18. The method of claim 17 further comprising the step of attaching a second specific binding entity to the first specific binding entity.

19. The method of claim 18 wherein said first specific binding entity is a DNA probe; wherein said second specific binding entity is a DNA target.

* * * * *